(12) United States Patent
Brault et al.

(10) Patent No.: US 10,473,035 B2
(45) Date of Patent: Nov. 12, 2019

(54) MODULAR ENGINE, SUCH AS A JET ENGINE, WITH A SPEED REDUCTION GEAR

(71) Applicant: SNECMA, Paris (FR)

(72) Inventors: Roland Gilbert Michel Brault, Quincy Sous Senart (FR); Nathalie Nowakowski, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 573 days.

(21) Appl. No.: 15/037,397

(22) PCT Filed: Nov. 6, 2014

(86) PCT No.: PCT/FR2014/052846
§ 371 (c)(1),
(2) Date: May 18, 2016

(87) PCT Pub. No.: WO2015/075345
PCT Pub. Date: May 28, 2015

(65) Prior Publication Data
US 2016/0298548 A1    Oct. 13, 2016

(30) Foreign Application Priority Data

Nov. 21, 2013 (FR) .................................. 13 61460

(51) Int. Cl.
*F01D 5/02*  (2006.01)
*F02C 7/36*  (2006.01)
(Continued)

(52) U.S. Cl.
CPC .................. *F02C 7/36* (2013.01); *F01D 5/02* (2013.01); *F01D 5/025* (2013.01); *F01D 5/026* (2013.01);
(Continued)

(58) Field of Classification Search
CPC ...... F02C 7/32; F02C 7/36; F02C 3/04; F02C 3/107; F01D 5/02; F01D 5/025;
(Continued)

(56) References Cited

U.S. PATENT DOCUMENTS 8,402,741 B1 *  3/2013  Merry .................... F01D 25/16
                                                      60/226.1
2007/0177936 A1  8/2007  Servant
(Continued)

FOREIGN PATENT DOCUMENTS

EP    1813792    8/2007
EP    2327859    6/2011

*Primary Examiner* — Phutthiwat Wongwian
*Assistant Examiner* — Loren C Edwards
(74) *Attorney, Agent, or Firm* — Womble Bond Dickinson (US) LLP

(57) ABSTRACT

The present invention relates to an engine (1) with a modular structure comprising a plurality of coaxial modules (A, B, C) with, at one end, a first module (A) comprising a power transmission shaft (3) and a speed reduction gear (7), said power transmission shaft being driven via the speed reduction gear (7) by a turbine shaft (2) secured to one (C) of said coaxial modules that is separate from the first module, the speed reduction gear comprising a drive means (8 and 9) fixed to the turbine shaft (2) and to a journal (13) of a shaft of a low-pressure compressor rotor (1 *a*), characterized in that it comprises a first nut (16) for fastening the drive means to the journal and a second nut (14) for fastening the drive means to the turbine shaft.

15 Claims, 2 Drawing Sheets

(51) Int. Cl.
*F02C 7/32* (2006.01)
*F02C 3/04* (2006.01)
*F02K 3/06* (2006.01)
*F04D 29/32* (2006.01)

(52) U.S. Cl.
CPC ............... *F02C 3/04* (2013.01); *F02C 7/32* (2013.01); *F02K 3/06* (2013.01); *F04D 29/321* (2013.01); *F04D 29/325* (2013.01); *F05D 2220/323* (2013.01); *F05D 2230/51* (2013.01); *F05D 2230/60* (2013.01); *F05D 2240/35* (2013.01); *F05D 2240/60* (2013.01); *F05D 2260/4031* (2013.01); *Y02T 50/673* (2013.01)

(58) Field of Classification Search
CPC . F01D 5/026; F02K 3/06; F02K 3/072; F04D 29/321; F04D 29/325; F05D 220/323; F05D 2230/51; F05D 2230/60; F05D 2240/35; F05D 2240/60; F05D 2260/4031; Y02T 50/673
USPC ........................................................ 60/805
See application file for complete search history.

(56) References Cited

U.S. PATENT DOCUMENTS

2009/0081039 A1    3/2009   McCune et al.
2012/0257960 A1   10/2012   Reinhardt et al.

\* cited by examiner

MODULAR ENGINE, SUCH AS A JET ENGINE, WITH A SPEED REDUCTION GEAR

FIELD OF THE INVENTION

The present invention relates to an aircraft propulsion engine, such as a turbojet engine, a multi-flow turbofan, in particular with a high dilution ratio, or a turboprop engine, having a front power transmission shaft, driven by a turbine rotor by means of a speed reduction gear. In the case of a turbofan, the fan is mounted in particular on this power transmission shaft.

PRIOR ART

Turbofan engines have a plurality of compressor stages, in particular a low-pressure (LP) compressor, also referred to as a feed or booster compressor, and a high-pressure (HP) compressor, which belong to the main body of the engine. Upstream of the low-pressure compressor a large, movable-blade wheel or fan is disposed, which feeds both the primary flow which passes through the LP and HP compressors and the cold flow, or secondary flow, which is concentric with the first and is directed either directly towards a cold flow nozzle, referred to as a secondary nozzle, or towards a mixer for the primary and secondary flows.

The fan is driven by the rotary shaft of the LP body and generally turns at the same speed as the latter. However, it may be advantageous to make the fan turn at a rotational speed of less than that of the LP shaft, in particular when the fan has very large dimensions, for the purpose of adapting said fan better aerodynamically. For this purpose a reduction gear is disposed between the LP shaft and a power transmission shaft, to which the fan is attached. The fan, the shaft and the reduction gear generally form part of the same module, which is located upstream and is referred to as a fan module.

Modern aircraft engines are often produced in the form of an assembly of modules which can include stationary parts and movable parts. A module is defined as a sub-assembly of an engine that has geometric features in the region of its interfaces with the adjacent modules which are sufficiently precise to enable it to be delivered individually and which has undergone a separate balancing when it has rotatable parts. The assembly of the modules makes it possible to construct a complete engine by decreasing as far as possible the operations of balancing and matching interfacing parts.

The modularity of an engine is a key element for maintenance. In fact, during an operation, it is necessary for the parts to be readily accessible without having to remove a considerable number of parts of the engine. In practice, attempts are made to break the engine down into several major modules. For example, for a front-fan turbojet engine the aim is to break it down into three modules: a first major module for the front part comprising the fan and the LP compressor, a second major module for the part comprising the HP body and a third major module for the rear part of the engine comprising the LP turbine and the turbine shaft.

Maintenance is particularly difficult on engines comprising a reduction gear in the front part. In this case the problem is the accessibility of an internal nut of a turbine by which two major modules are connected to one another. It should be noted that in a double-body turbojet engine, for example, at the front the internal nut connects the LP turbine shaft to the fan shaft. On the engines according to the prior art having a reduction gear architecture, intervention on the first major module necessitates the removal of a first part of the reduction gear in order to have access to the turbine nut since this is concealed by the reduction gear. In this case the modularity of the first major module is lost. In addition, it is necessary to separate the second major module and the third major module so that they are independent.

DESCRIPTION OF THE INVENTION

The present applicant has defined the object of the invention as the production of an engine having a reduction gear, which solves this problem of modularity.

This object is achieved according to the invention by an engine having a modular structure, comprising a plurality of coaxial modules having, at one end, a first module comprising a power transmission shaft and a speed reduction gear, said power transmission shaft being driven via the speed reduction gear by a turbine shaft secured to one of said coaxial modules which is separate from the first module, the speed reduction gear comprising a drive means fastened to the turbine shaft and to a journal of a shaft of a low-pressure compressor rotor shaft, characterised in that it comprises a first nut for fastening the drive means to the journal and a second nut for fastening the drive means to the turbine shaft.

The speed reduction gear is preferably arranged in such a way that it has a central opening configured to enable access of a fitting/removal tool, through said opening, to the second nut from said end of the engine. The second nut is referred to below as the turbine nut.

In the present application, an engine having a modular structure is understood to be an engine which is formed by the assembly of modules. This type of engine is well known in the aeronautical field and in particular facilitates the operations of assembly and dismantling an engine, for example during a maintenance operation.

The invention proposes in particular to detach the means for fastening the drive means to the turbine shaft from the means for fastening the drive means to the journal. Due to these features, the problem of modularity of the engine is solved since the first module can be detached from the modules situated at the rear without the speed reduction gear being removed beforehand. In fact, the unscrewing of the second nut (or turbine nut) makes it possible to detach the drive means from the turbine shaft without detaching the drive means from the journal, the drive means remaining secured to one another due to the first nut. It is therefore conceivable to remove and to withdraw the first module by unscrewing a single nut, and there is no risk of this module being further detached due to the unscrewing of the second nut.

The drive means of the speed reduction gear is preferably annular in shape and has said central opening for the passage of a tool for fitting/removing the turbine nut. The drive means is itself connected to the input gear wheel of the speed reduction gear which for example has an epicyclic gear train having an input wheel secured to the planetary gear and the power transmission shaft driven by the satellites.

According to one embodiment, the front end of the turbine shaft is supported by a bearing secured to the first module.

More particularly, the drive means of the speed reduction gear forms at least one wall for a leakproof enclosure for lubricating and cooling said bearing. This solution has the advantage that it enables the removal of the first module whilst retaining the lubricating oil therein. It is not necessary to evacuate the lubricating oil beforehand.

In order to ensure the complete fitting/removal of the first module, said module is likewise retained by a removable means for fastening to a housing element of the engine.

Advantageously, the first nut has a diameter greater than that of the first nut.

The invention applies to a turbojet engine comprising an engine as described above, the first module of which comprises a fan mounted on said power shaft. More particularly, the invention applies to a turbojet engine having a second module, downstream of the first module, the second module including a rotor, formed by a high-pressure compressor and a high-pressure turbine, and a combustion chamber. It applies in particular to a turbojet engine of which the casing of the first module is secured to the casing of the second module by a removable fastening means.

The turbojet engine preferably comprises a third module having a low-pressure turbine, said turbine shaft being secured to the rotor of the low-pressure turbine of the third module.

Finally the invention likewise relates to a turbojet engine as described above, comprising three successive modules, said first module having a fan rotor and the low-pressure (LP) compressor or booster compressor, a second module having a rotor formed by a high-pressure compressor, a high-pressure turbine and a combustion chamber, and a third module having a low-pressure turbine rotor and a coaxial turbine shaft which has the high-pressure rotor and, when in use, is connected to the fan rotor by means of the speed reduction gear, this turbojet engine being of the multi-flow type.

The first module preferably comprises a low-pressure compressor rotor having a low-pressure compressor shaft comprising a journal supported by a bearing secured to the first module and locked axially by a lock nut of the rotor of the low-pressure compressor.

In a particular embodiment, the first module or fan module comprises at least one part for supporting the fan shaft by means of two bearings, said supporting part comprising a first fastening flange of the module, which flange is shaped so as to be attached to a second flange carried by a structural part of the turbojet engine, and the speed reduction gear is carried by a support casing comprising a flange shaped in order to be able to be fastened to said second structural flange of the turbojet engine, in such a way as to be able to fit the speed reduction gear on said fan module prior to the assembly of the fan module on at least one other module of the turbojet engine.

DESCRIPTION OF THE DRAWINGS

The invention will be better understood, and other objectives, details, features and advantages thereof will become more apparent in the course of the following detailed explanatory description of an embodiment of the invention given by way of purely illustrative and non-limiting example, with reference to the appended schematic drawings, in which:

FIG. 3 is a view of the engine of FIG. 1, the first module of which is detached, FIG. 4 is a view of the engine of FIG. 1, the three modules of which are separated from one another.

DETAILED DESCRIPTION OF AN EMBODIMENT

Figure 1:
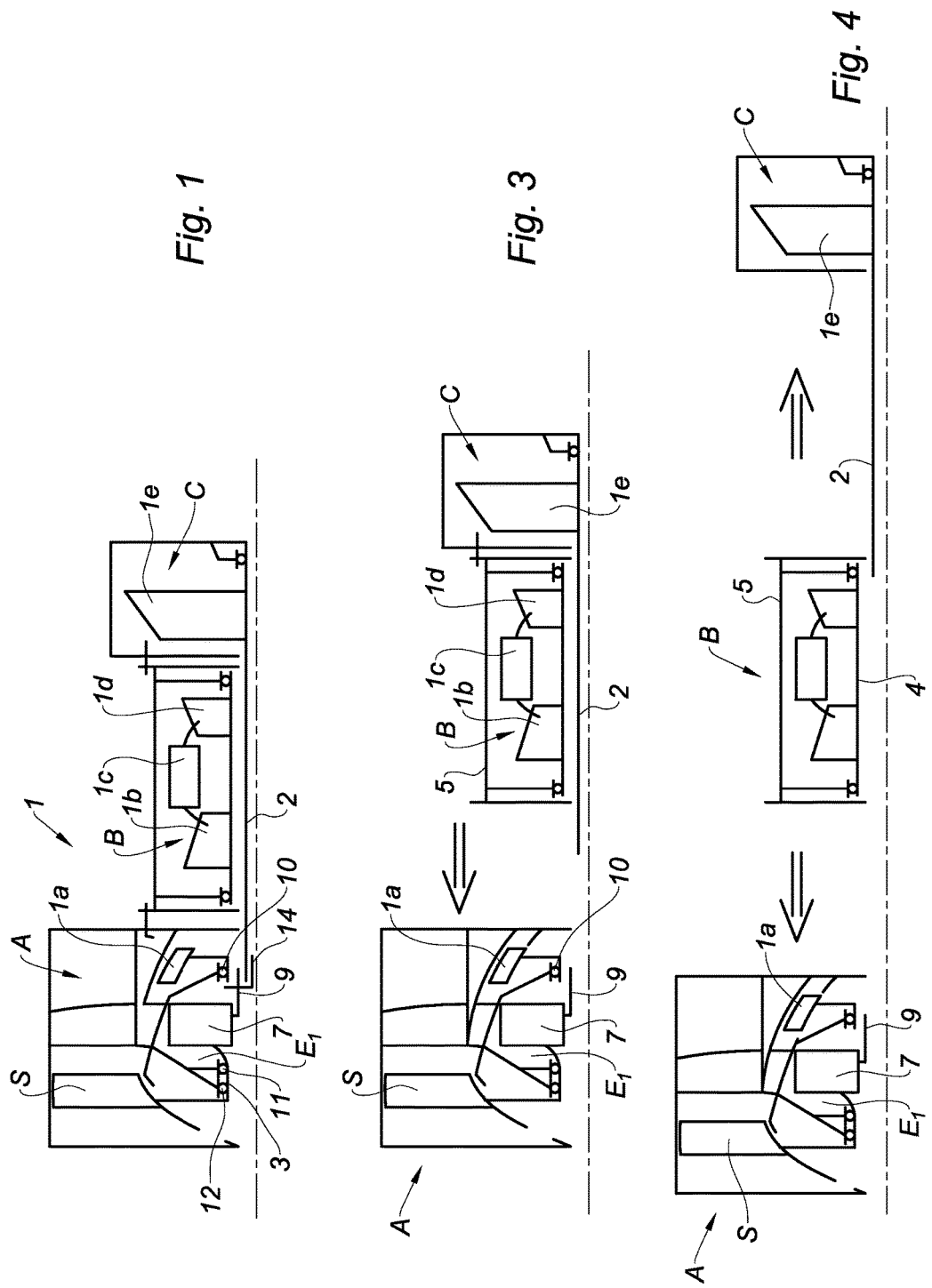
FIG. 1 is a general axial cross-sectional view of a bypass turbojet engine with a high dilution ratio incorporating a speed reduction gear.

With reference to FIG. 1, a turbojet engine 1 is shown having an axis XX which includes a fan S, a low-pressure or booster compressor 1a, a high-pressure compressor 1b, a combustion chamber 1c, a high-pressure turbine 1d, and a low-pressure turbine 1e. The high-pressure compressor 1b and the high-pressure turbine 1d are connected by a high-pressure shaft 4 and form a high-pressure HP body therewith. The high-pressure compressor 1a and the high-pressure turbine 1e are connected by a high-pressure shaft 2 and form a high-pressure HP body therewith.

In the conventional configurations, the disc on which the blades of the fan S are mounted is rotated by a power transmission shaft or fan shaft 3. Said shaft is itself driven directly by the LP shaft 2. In the engine according to the invention, the power transmission shaft 3 is driven by the LP shaft 2 via a speed reduction gear 7, this reduction gear preferably having an epicyclic gear train.

In this case the engine is sub-divided into three major modules: a first module A, referred to as the fan module, comprises a stationary part comprising the fan casing forming the housing of the fan, the intermediate casing forming, inter alia, a support for different bearings, 10, 11, 12, and an interface for fastening to the adjacent module B. The movable part of the first module A comprises the fan S with its fan shaft 3 supported by the fan bearings 11 and 12, one a thrust ball bearing and the other a roller bearing. Said movable part also comprises the LP compressor 1a supported by a low-pressure shaft bearing 10, a ball bearing. As is known, the rolling bearings are provided between a stationary ring and a movable ring. The stationary ring 10 of the bearing of the low-pressure shaft is mounted on a bearing support 23 and the stationary rings of the bearings 11 and 12 of the fan are mounted on a bearing support 22 (see FIG. 2). The speed reduction gear 7 is accommodated between the fan and the LP shaft 2 in the space defined between the supports 22 and 23, which are secured to the intermediate casing.

The second major module B likewise comprises movable parts such as the HP body having the compressor 1b and the turbine 1d and stationary parts such as the combustion chamber 1c and all the casing elements which are associated therewith, including the housing 5.

The third module C comprises movable parts such as the LP turbine 1e and the LP turbine shaft 2 and stationary parts such as the exhaust casing forming a support for the bearing at the rear, and the exhaust pipe.

Figure 6:
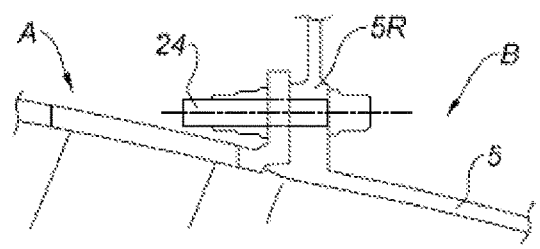
FIG. 6 shows the detail of the fastening of the interface of the first module on a flange of the second module.

The purpose of the modular structure is to allow the elements of the different modules to be pre-assembled independently of one another in such a way that they are ready to be assembled without the use of complex operations. Thus the first module A can be secured to the following modules by simply connecting the movable parts by means of a turbine nut, the turbine nut 14 connecting a drive means of the speed reduction gear to the LP turbine shaft 2. The securing is also obtained by connecting the stationary parts by bolting the interface of the module A to a radial flange of the casing of the module B. An example of this latter mode of connection is shown in FIG. 6.

FIG. 3 shows the engine, the first module of which has been separated from the rest of the engine. As indicated above, the first module is released by unscrewing the turbine nut 14 on the one hand and by unscrewing the bolts 24 which retain the stationary interface of the first module A on the radial flange 5R of the casing 5 of the second module (see FIG. 6).

FIG. 4 shows the separation of modules B and C from one another. By disengaging the respective casing elements from one another, it is possible to separate the two modules axially from one another; the turbine shaft 2 is no longer retained by the turbine nut and can be disengaged from the second module.

Figure 2:
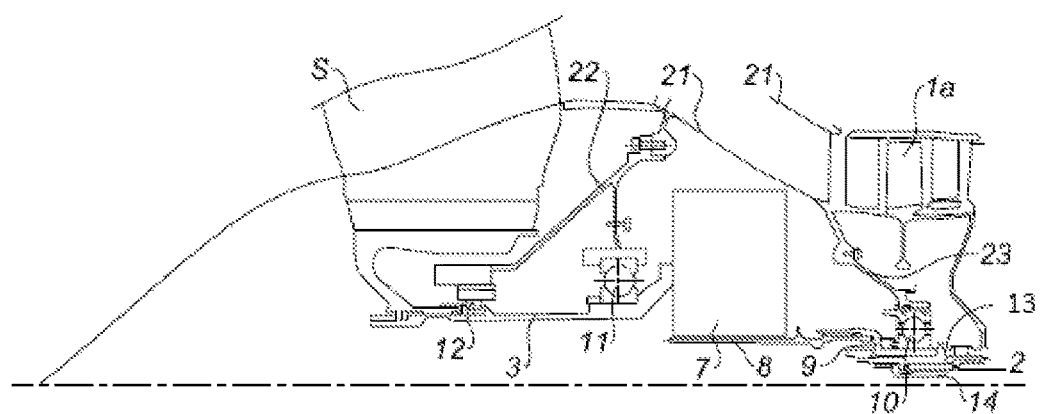
FIG. 2 is a partial view of FIG. 1 showing the front part with the reduction gear.

FIG. 2 shows the front part of the engine in greater detail, the reduction gear 7 being positioned between the power transmission shaft 3 attached to the fan and the LP shaft 2. This reduction gear, a priori of the epicyclic type, is depicted schematically as a rectangle only showing the overall dimensions thereof. It is carried, in a manner which is not shown, by the supports of bearings 22 and 23 attached to the intermediate casing and is driven by an input ring gear 8 of the reduction gear extending upstream of the LP shaft 2, with which it cooperates via drive means. The output torque of this reduction gear 7 is transmitted to the fan shaft 3 by a conventional connection known to the person skilled in the art, such as fastening this fan shaft to a planet carrier, in this case an epicyclic reduction gear.

In the drawing, a stationary part of the engine comprises the internal wall 21 of the primary flow duct, an upstream support for a bearing 22 and a downstream support for a bearing 23. These two supports extend towards the interior of the turbine engine, enclosing the bearings of the thrust bearing 10 supporting the LP shaft 2, and those of the thrust ball bearings 11 and roller bearings 12 of the fan shaft 3. Besides the rotor of the fan S, a movable part includes, from upstream to downstream, the fan shaft 3 on which the movable rings of the bearings 11 and 12 of the fan shaft are attached, the ring gear 8 for driving the reduction gear, and an intermediate shaft 9 for extending the driving ring gear, which is fixed on the movable ring of the thrust bearing 10 of the LP shaft 2. These stationary and movable parts form an enclosure E1 and are conventionally attached in the region of labyrinths positioned at its front and rear ends, in such a way as to form a leakproof space which contains the three bearings 10, 11 and 12 mentioned above and which ensures that said bearings are constantly lubricated and cooled. The aforementioned sealing joints are not shown but are known per se by the person skilled in the art.

This enclosure E1 is entirely carried by the first module A, and this enables it to be detached from the other modules as well as from the LP shaft 2, without the oil enclosed therein escaping. Moreover the diameters of the input ring gear of the reduction gear 8 and of the intermediate shaft 9 of the LP shaft are defined so as to be greater than that of the LP shaft 2, which means that it is possible to introduce a cylindrical tool therein in order to reach the nut for fastening the LP shaft 2 on the movable ring of its thrust bearing 10 and to enable said nut to be unscrewed without these two parts interfering.

Figure 5:
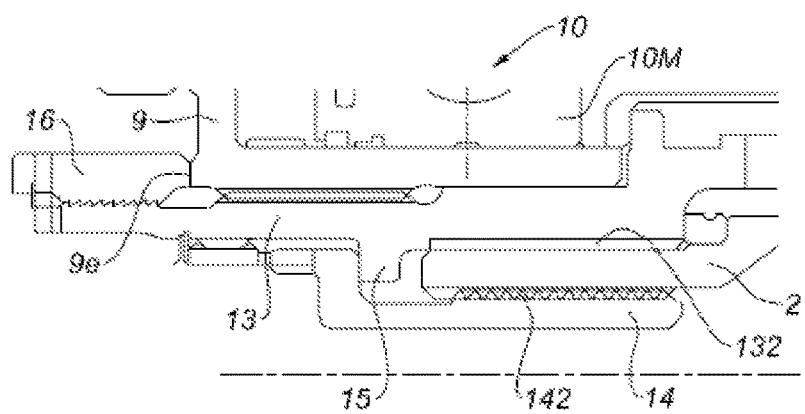
FIG. 5 shows the detail of the turbine nut in place on the engine.

FIG. 5 shows in greater detail the turbine nut when it is in place on the turbine shaft.

Starting from downstream, the LP shaft 2 engages, by a system of splines 132, on a journal 13 which is connected to the movable ring 10M of the thrust bearing 10 and is extended downstream by the shaft of the low-pressure compressor 1a and drives the rotor of the low-pressure compressor 1a. The LP shaft 2 is held in place axially on this journal by means of a turbine nut 14 which is screwed onto a thread 142 provided on the internal face of the LP shaft 2 and which is supported against an axial abutment 15 extending radially towards the interior from the journal 13. This nut 14, which attaches the LP shaft 2 to the journal 13, is accessible from the front of the engine, albeit with prior removal of the cap from its front tip, but without it being necessary to remove other parts and in particular elements which form the walls of the enclosure E1. Thus an object of the invention is achieved, namely the possibility of separating the first module A from the LP shaft 2 without dismantling the enclosure E1.

As can also be seen in FIG. 5, the journal 13 carries the intermediate shaft 9 upstream, which shaft forms a means for driving the input ring gear 8 of the reduction gear and is situated radially between the journal 13 and the movable ring 10M of the thrust bearing 10 of the LP shaft to which it is rigidly connected. The purpose of this intermediate shaft 9 is to extend the ring gear 8 and to enable the removal thereof with the journal 13, without this separation of the ring gear into two distinct elements—an actual ring gear 8 and an intermediate shaft 9—being essential to the implementation of the invention. The downstream end of this intermediate shaft 9 is positioned around the LP shaft 2 and, because of the greater diameter of the shaft, enables access to the nut 14 for fastening the LP shaft from the front of the engine. Consequently, together with the input ring gear 8 it forms a wall element of the front enclosure E1 which is detachable from the LP shaft 2 but which can remain in place and maintain the volumetric integrity of the front enclosure E1 when the LP shaft 2 is withdrawn.

Finally the ring gear 8 for driving the reduction gear is mounted on the intermediate shaft 9 by means of splines which cause the two shafts to cooperate and which enable driving of the ring gear 8, and therefore of the reduction gear 7, by the LP shaft 2. For the same reasons as before, said ring gear also has a diameter greater than that of the LP shaft 2.

As can be seen in FIG. 5, a nut 16 is screwed onto an upstream end portion of the journal 13 and is in axial abutment against a shoulder 9e of the intermediate shaft 9. The intermediate shaft 9 itself bears axially against the movable ring 10M of the bearing 10 supporting the upstream end of the LP turbine shaft 2. Thus this nut 16 axially locks the drive shaft of the low-pressure compressor 1a. By this nut, the rotor of the low-pressure compressor, also referred to as a booster compressor, is held in place in the first module A, which can be handled without risk of damage to this movable part.

The nut 16 has a diameter greater than that of the nut 14 and therefore does not impede the passage of the tool for fitting/removing the nut 14.

The invention claimed is:

1. An engine having a modular structure, comprising a plurality of coaxial modules having, at one end of said engine, a first module comprising a power transmission shaft being driven via a speed reduction gear by a turbine shaft secured to one of said coaxial modules which is separate from the first module of said engine, the first module comprising a low-pressure compressor rotor with a low-pressure compressor shaft having a journal, the speed reduction gear comprising a drive means having an intermediate shaft driven by the turbine shaft through the journal, wherein the engine comprises a first nut for fastening the intermediate shaft to the journal and a second nut for fastening the journal to the turbine shaft, said first nut being screwed onto an upstream end portion of the journal, and the first nut being in axial abutment against a shoulder of the intermediate shaft, the journal having an upstream portion carrying the intermediate shaft, said intermediate shaft being situated radially between the journal and a rotating ring of a thrust bearing, and wherein the intermediate shaft is rigidly connected to the rotating ring.

2. The engine according to claim 1, wherein the speed reduction gear is arranged such as to have a central opening configured to enable access by a fitting/removal tool, through said opening, to the second nut from said end of the engine.

3. The engine according to claim 1, wherein the drive means of the speed reduction gear is annular in shape and has a central opening for passage of a tool for fitting/removing the second nut.

4. The engine according to claim 3, wherein a front end of the turbine shaft is supported by a bearing secured to the first module, and wherein the drive means of the speed reduction gear forms at least one movable walk for a leakproof enclosure for lubricating and cooling said bearing.

5. The engine according to claim 1, wherein a front end of the turbine shaft is supported by a bearing secured to the first module.

6. The engine according to claim 1, wherein the first module is retained by a removable means for fastening to a housing element of the engine.

7. The engine according to claim 1, wherein the first nut has a diameter greater than that of the second nut.

8. A turbojet engine comprising an engine according to claim 1, wherein the first module comprises a fan mounted on said power shaft.

9. The turbojet engine according to claim 8, comprising a second module, downstream of the first module, the second module including a rotor, formed by a high-pressure compressor and a high-pressure turbine, and a combustion chamber.

10. The turbojet engine according to claim 9, comprising a third module having a low-pressure turbine, said turbine shaft being secured to a rotor of the low-pressure turbine of the third module.

11. The turbojet engine according to claim 8, comprising three successive modules, said first module having a fan rotor and the low-pressure compressor rotor, a second module having a rotor, formed by a high-pressure compressor and a high-pressure turbine, and a combustion chamber, and a third module having a low-pressure turbine rotor and a coaxial turbine shaft that has a high-pressure rotor and, when in use, is connected to the fan rotor by means of the speed reduction gear, wherein the turbojet engine is a multi-flow type.

12. The engine according to claim 1, wherein the intermediate shaft comprises an upstream end portion driving an input ring gear of the speed reduction gear, and a downstream end portion connected to the low-pressure compressor shaft of the low-pressure compressor rotor.

13. The engine according to claim 12, wherein the input ring gear has a diameter greater than that of the turbine shaft.

14. The engine according to claim 1, wherein the turbine shaft engages the journal by splines disposed on a downstream portion of the journal.

15. The engine according to claim 1, wherein the second nut is mounted onto a thread of an internal surface of the turbine shaft which is supported against an axial abutment extending radially and inwardly from the journal.

* * * * *